United States Patent [19]
Watanabe

[11] Patent Number: 5,849,126
[45] Date of Patent: Dec. 15, 1998

[54] SYSTEM FOR MANUFACTURING STACK OF WHICH MANUFACTURE INVOLVES PRESSING/CLAMPING AND CURING

[75] Inventor: Masaru Watanabe, Nagoya, Japan

[73] Assignee: Nichiha Corporation, Aichi, Japan

[21] Appl. No.: 825,470

[22] Filed: Mar. 28, 1997

[30] Foreign Application Priority Data

Feb. 20, 1997 [JP] Japan .................................. 9-036101

[51] Int. Cl.⁶ .................................................. B32B 31/00
[52] U.S. Cl. ...................... 156/228; 156/307.1; 156/381; 156/499; 156/538; 156/580
[58] Field of Search .................... 156/381, 382, 156/499, 538, 539, 580, 583.1, 228, 307.1; 100/207

[56] References Cited

U.S. PATENT DOCUMENTS

| | | | |
|---|---|---|---|
| 3,753,489 | 8/1973 | Tomioka et al. ................ | 100/207 X |
| 4,543,147 | 9/1985 | Noto et al. ....................... | 156/288 |
| 4,689,105 | 8/1987 | Fazlin et al. ..................... | 156/382 |
| 5,403,766 | 4/1995 | Hacker et al. ................... | 100/207 |
| 5,470,428 | 11/1995 | Sanko ............................. | 156/498 |
| 5,477,901 | 12/1995 | Schikarski et al. .............. | 156/498 |
| 5,496,433 | 3/1996 | Miyashita et al. ............... | 156/358 |

FOREIGN PATENT DOCUMENTS

| | | |
|---|---|---|
| 59 34500 | 8/1984 | Japan . |
| 08 208354 | 8/1996 | Japan . |

Primary Examiner—James Sells
Attorney, Agent, or Firm—Pillsbury Madison & Sutro

[57] ABSTRACT

A system for manufacturing a stack the manufacture of which involves pressing/clamping and curing where improved productivity is imparted to that system by improving upon a stack transfer system. The manufacturing system comprises a press machine 1 for pressing/clamping a stack and for unclamping the stack; a curing chamber 20 for curing the stack pressed/clamped; and first and second transfer device connecting said press machine and the curing chamber, the first transfer device being in charge of a step of transfer of the stack pressed/clamped by means of the press machine therefrom to the curing chamber, the second transfer device being in charge of a step to transfer of the stack cured in the curing chamber therefrom to the press machine. A waiting station may be provided between the press machine 1 and the curing chamber 20 to put a cured stack on standby at the waiting station and then deliver the cured stack to the press machine.'

9 Claims, 6 Drawing Sheets

SYSTEM FOR MANUFACTURING STACK OF WHICH MANUFACTURE INVOLVES PRESSING/CLAMPING AND CURING

BACKGROUND OF THE INVENTION

1. Field of the Invention

The present invention relates to a system for manufacturing a stack of uncured mats the manufacture of which involves pressing/clamping and curing the uncured mats into cured structures. More particularly, it relates to a system for manufacturing such a stack where the manufacture involves pressing/clamping and curing a number of uncured mats, arranged in individual stacks, with improved productivity to the system being imparted by improving upon a stack transfer system between a press machine, for pressing/clamping a stack and re-pressing/unclamping the stack, and a curing chamber for curing and hardening the pressed/clamped stack.

2. Description of the Prior Art

There are some products, such as a wood-cement board and a panel board prepared by bonding with an adhesive, which are, during their production, cured for a predetermined period of time under pressed/clamped conditions. For example, production of a wood-cement board in a conventional dry method comprises adding a reinforcing material such as a wood flake and a bundled wood fiber, an accelerator, water, and if desired, an auxiliary material such as a silicate containing material, an aggregate and a foamed material to a cement as a base material. This material is mixed to prepare a starting material. The mixture of starting material is placed on a transfer plate and a mat is prepared. A number of mats prepared in such a manner are stacked, the stack is pressed and clamped and then cured. Thereafter, the stack is repressed and unclamped. In order to improve productivity, it has been proposed to perform pressing/clamping of a stack and re-pressing/unclamping of a cured stack by means of the same press machine, for example, in Japanese Examined Patent Publication No. 34500/1984, and the stack is transferred by an appropriate transfer means shuttling between the press machine and the curing or hardening chamber.

Figure 5:
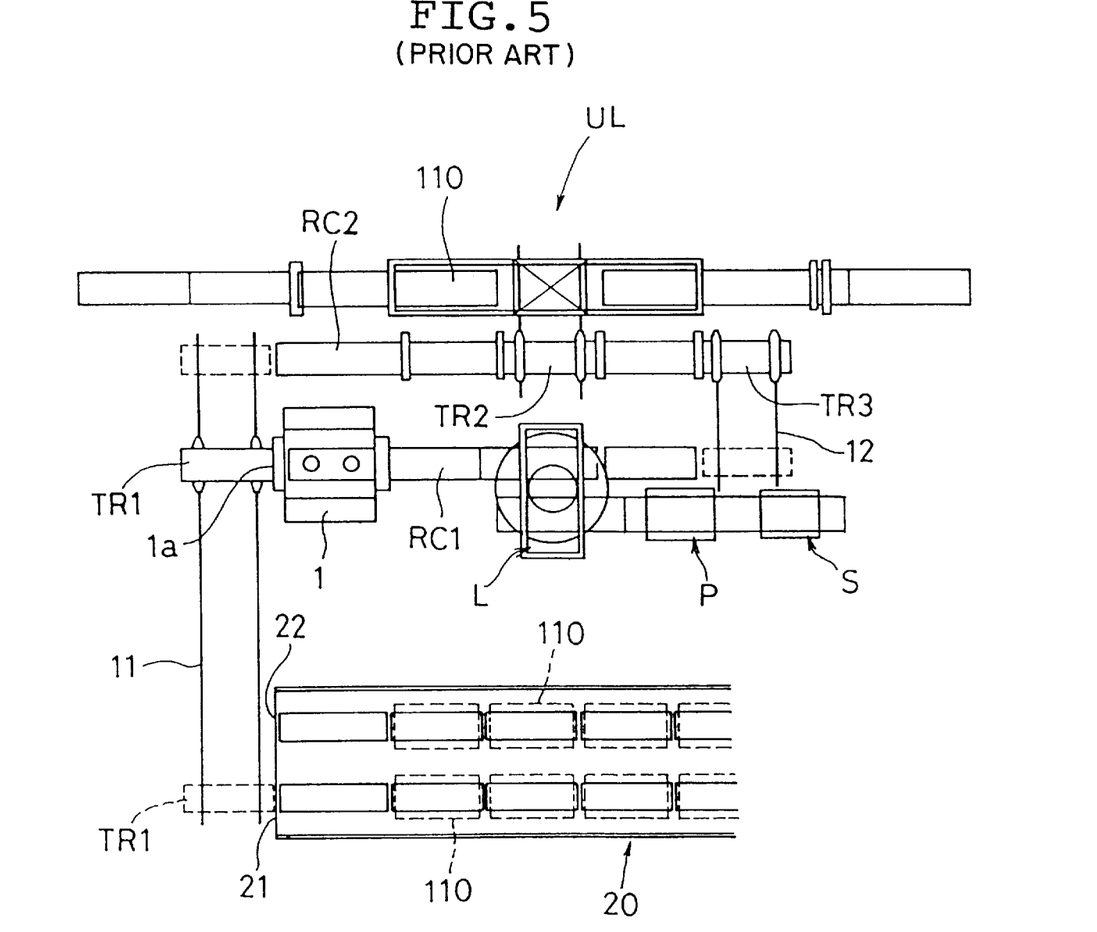
FIG. 5 is an illustrative view of one form of a conventional system for manufacturing a stack of which the manufacture involves pressing/clamping and curing.

FIG. 5 illustrates an example of a system for manufacturing a wood-cement board. In a mat-forming step in a board forming process, a cement-based mixture as a starting material is placed on a transfer plate to form mat. A plurality of mats prepared in such a manner are pre-stacked preferably by a stacking apparatus S. The resulting stack of mats is transferred to a pre-press machine P and pre-pressed. The stacking apparatus S and the pre-press machine P are used in order to increase number of mats constituting a mat stack to be fed to a press machine. For example, those described in co-pending U.S. patent application Ser. No. 08/565,109 (corresponding to Japanese Patent Application No. 274195/1995) are used, which has previously been filed in the name of the same inventor as the present application, the disclosure of which is incorporated herein by reference.

A number of such pre-pressed mat stack precursors (for example, 50 stack precursors) which have not yet been subjected to curing are one after another transferred to a rotary loader L and, by an arm of the loader L, lifted up and turned in an angular amount of 180 degrees and laid on top of one another to form a mat stack 110 (see Fig.6) on a lower plate 9 (see Fig.6) which will be described below. The lower plate 9 with the stack 110 mounted thereon is transferred to a press machine 1 by means of a first roller conveyor RC1.

FIG. 6 illustrates an example of the press machine 1. In the press machine 1, the stack 110 comprising a number of uncured mats is placed on the lower plate 9 and transferred to a pressing/clamping position of the roller conveyor RC1, as shown in Fig.6(a). The press machine 1 comprises an upper stationary platen 3 and a lower movable platen 2. An upper plate 8 is fastened to the upper stationary platen 3 by appropriate fastening means 4.

Figure 6A:
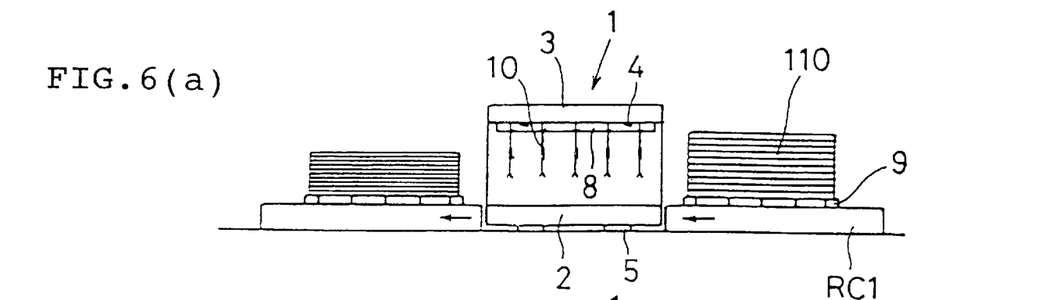
FIG. 6(a) to (d) is a scheme illustrating operation of a press machine used in each of the manufacturing systems in FIGS. 1 to 5.
Figure 6B:
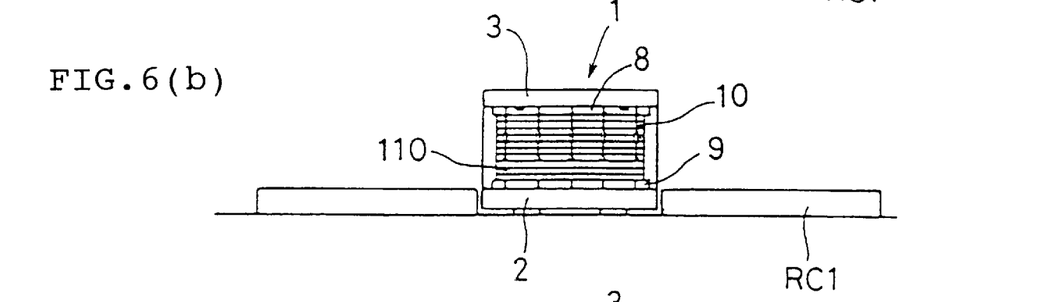
Figure 6C:
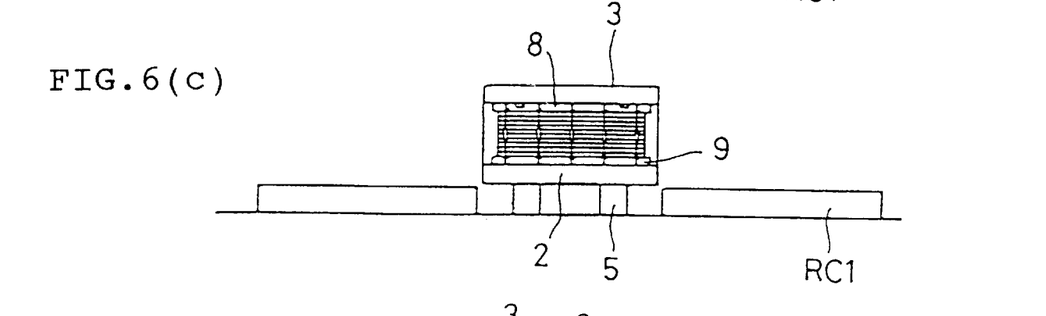
Figure 6D:
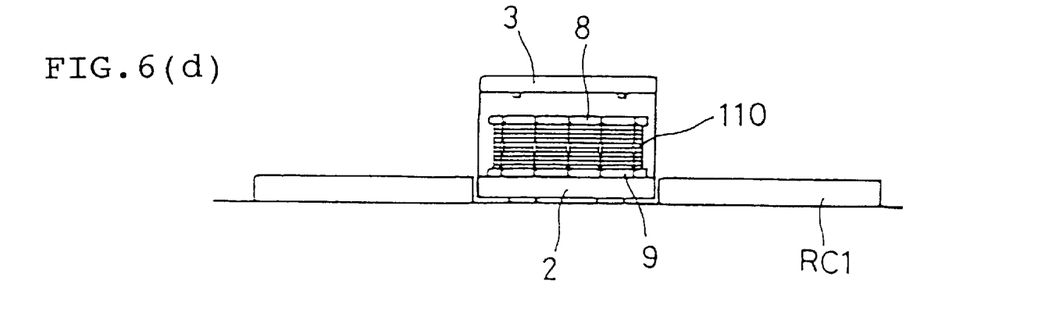

To the upper plate 8, clamping metal members 10 which serve as link means are attached [see Fig.6(b)]. The lower movable platen 2 is raised by means of a hydraulic cylinder unit 5 to press the uncured mat stack 110, and the lower ends of the clamping metal members 10 are connected to the lower plate 9 to link the upper plate 8 and the lower plate 9 together [see Fig.6(c). After the upper and lower plates are linked together, the upper plate 8 is detached from the upper stationary platen 3. The hydraulic cylinder unit 5 is then actuated to lower the lower movable platen 2 to the original position [see Fig.6(d)]. The uncured mat stack 110 clamped between the upper plate 8 and the lower plate 9 is transferred from the press machine 1 to a first traverser TRI shown in FIG. 5.

The first traverser TR1 travels along rails 11 to an entrance 21 of a curing chamber 20 to deliver the uncured mat stack 110, clamped under pressure between the upper plate 8 and the lower plate 9, to the curing chamber 20 at a temperature of 50° to 80° C. In the curing chamber 20, the uncured mat stack 110 is allowed to stand for 10 to 25 hours to advance curing and hardening and thereby aging the cured mat stack. As shown in Fig.5, the curing chamber 20 is so constructed as to be capable of containing a number of uncured mat stacks 110, and uncured mat stacks 110 fed thereto travel along a course in the curing chamber 20 in succession and ultimately arrive at an exit 22 of the curing chamber 20 one after another.

After delivery of an uncured mat stack 110, the first traverser TR1, which has transferred an uncured mat stack 110, is moved to the exit 22 of the curing chamber 20 to receive a stack 110 which has been cured under pressure between the upper plate 8 and the lower plate 9. On receiving the cured stack 110, the first traverser TR1 travels along the rails 11 to return to an exit 1a of the press machine 1, which is unoccupied at this time. The first traverser TR1 feeds the cured stack 110 to the unoccupied press machine 1. By means of the press machine 1, a procedure similar to that described with reference to Fig.6 is carried out. Specifically, the lower movable platen 2 is raised by the hydraulic cylinder unit 5 to re-press the cured stack 110. Then the clamping metal members 10 are disconnected from the lower plate 9.

Since the upper plate 8 is fastened to the upper platen 3 by the fastening means 4 at this time, when the hydraulic cylinder unit 5 is actuated to lower the lower movable platen 2, the cured mat stack 110 is released from the clamping force. After the release from the clamping force (the release is hereinafter referred to as unclamping), the cured mat stack 110 is once more passed together with the lower plate 9 from the exit 1a of the press machine 1 to the first traverser TR1 and transferred to an unloader UL. Specifically, the first traverser TR1 travels upwardly when viewed in FIG. 5 and delivers the cured mat stack 110 with the lower plate 9 to a second roller conveyor RC2 at a predetermined position.

The cured mat stack 110 with the lower plate 9 is transferred from the second roller conveyor RC2 via a second traverser TR2 to the unloader UL.

The cured mat stack 110 and the lower plate 9 are separated in the unloader UL and separately taken out therefrom. The cured mat stack 110 has its four sides trimmed and is subjected to the subsequent process. The transfer plate (not shown) is returned to the board forming process and re-used therein. The lower plate 9 is returned to an upstream position relative to the rotary loader L by means of a third traverser TR3 which travels along rails 12 and re-used as a lower plate which will be stacked with a number of mat stack precursors by means of the loader L. The rotary loader L and the unloader UL mentioned herein are those which have been well-known, and the traversers TR are also those which have been known, for example, those disclosed in Japanese Unexamined Patent Publication No. 208354/1996. Accordingly, detailed a explanation on these apparatuses is omitted.

According to the above-described system, in the same press machine, not only the step of pressing/clamping an uncured mat stack but also the step of re-pressing/unclamping an uncured mat stack and also the step of re-pressing/unclamping a cured stack can be carried out. This enables a simplified system for manufacturing a stack of which the manufacture involves pressing/clamping and curing to be realized. Further, the operation may be carried out continuously, thereby attaining improved operational efficiency of the system as a whole.

However, productivity of the above-described manufacturing system will be reviewed as follows. It is relatively easy, in light of the present state of the art, to increase the speed of the mat-forming step by ensuring the stable feed of a starting material of mats. It is easy to increase the feed rate of uncured mat stacks to the press machine. Further, it is easy to enlarge the space for accommodating pressed/clamped stacks in the curing chamber (hardening chamber). In view of these, the productivity of the system is considered to be dependent upon the length of the interval between the removal of one unclamped stack from the press machine and the next such removal.

The length of the interval between the removals of an unclamped stack from the press machine depends mainly upon the period between the time of a removal of an unclamped stack from the press machine and the time of the subsequent delivery of a stack to be unclamped by the press machine. In the system shown in Fig.5, the one traverser which travels along the one line of rails is concurrently in charge of the two steps, i.e., (1) the transfer of a pressed/clamped uncured mat stack from the press machine to the curing chamber, and (2) the transfer of a cured stack from the curing chamber to the press machine. Accordingly, it is impossible that the interval is shorter than the period between departure of the traverser from the press machine and return of the traverser to the press machine. This has put limitations on any improvement of the productivity although it is technically easy to increase the speed of the mat-forming step. In this connection, in view of safety, the speed of the traverser loaded with a mat stack should be limited as a matter of course.

In a conventional manufacturing system, the time for pressing/clamping, curing and re-pressing/unclamping depends upon manufacturing conditions, facilities and the like, and accordingly, cannot be broadly specified. For example, however, a procedure which comprises pressing/clamping a stack of 50 mats, each having a length of about 4 m, and curing and re-pressing/unclamping the stack takes generally about 13 minutes with hardening time not included. If the mat-forming rate is assumed to be 12 m/min, stacking of 50 mats takes (4 m×50)/(12 m/min)=16 minutes and 40 seconds. It follows that the time for the pressing/clamping, curing, and re-pressing/unclamping has an allowance of about three minutes.

However, if the mat-forming rate is increased by 50% to promote productivity, the mat-forming rate is 18 m/min. A stack of 50 mats each having a length of 4 m is prepared in (4 m×50)/(18 m/min)=11 minutes and 7 seconds. As described above, a series of the steps of pressing/clamping, curing, and repressing/unclamping by means of the manufacturing system in Fig.5 takes 13 minutes and thus lags behind the preparation of the stack of 50 mats.

Several measures to, (1) increase number of constituent mats of a stack, (2) separately provide a press machine for repressing/unclamping, and (3) reduce the distance between the press machine and the curing chamber, may be proposed. However, (1) and (3) include various restrictions or limitations in relation to the other machinery and are thus unpractical measures. With respect to (2), the cost of equipment is undesirably high.

Accordingly, proposal (2) is economically disadvantageous.

SUMMARY OF THE INVENTION

It is, therefore, an object of the present invention to provide a system for manufacturing a stack, the manufacture of which involves clamping under pressure and curing, with productivity being greatly improved by simply adding relatively simple means without expending a large equipment investment.

The present invention has been made to solve the above problems, and there is provided according to the present invention, as the first form, a system for manufacturing a stack, the manufacture of which involves pressing/clamping and curing, the system comprising:

a press machine for pressing/clamping a stack and for unclamping the stack, a curing chamber for curing the stack pressed/clamped, and first and second transfer devices connecting the press machine and the curing chamber. The first transfer device is in charge of the step of transferring the pressed/clamped stack from the press machine to the curing chamber. The second transfer device is in charge of the step of transferring the cured stack from the curing chamber to the press machine.

According to this system, the step of delivery of a pressed/clamped stack from the press machine to the curing chamber and the step of delivery of a cured stack from the curing chamber to the press machine can be carried out in parallel. By virtue of this, a cured stack can be fed into the press machine, which is unoccupied since pressed/clamped stack has been discharged, in a short time as compared with the conventional system. In consequence, it is possible to attain a shortened interval between removals of an unclamped stack. This leads to greatly improved productivity. The addition of the separate transfer device can also be accommodated in a conventional system. Accordingly, the conventional system can substantially be utilized. A large equipment investment, for example, due to separately providing a press machine for re-pressing/unclamping is not required. This enables improved productivity to be realized at a low cost.

As the second form, there is provided according to the present invention a system for manufacturing a stack of which the manufacture involves pressing/clamping and curing, the system comprising:

a press machine for pressing/clamping a stack and for unclamping the stack, a curing chamber for curing the stack pressed/clamped, a waiting stage located between the press machine and the curing chamber, first transfer device connecting the press machine and the curing chamber, with the first transfer device being in charge of the step of transferring the pressed/clamped stack by the press machine to the curing chamber and the step of transferring the stack cured in the curing chamber therefrom to the waiting stage.

Also included is a second transfer device connecting the waiting stage and the press machine, the second transfer device being in charge of the step of transferring of the cured stack placed on the waiting stage to the press machine.

The second form is characteristically provided with the stack waiting stage between the press machine and the curing chamber, and the second transfer means transfers a cured stack between the waiting stage and the press machine. By virtue of this, a further shortened time for transferring a cured stack to be unclamped to the press machine is realized. This leads to further improved productivity. Moreover, re-pressing/unclamping of a cured stack and discharge of the unclamped stack can be completed earlier. Accordingly, taking of an uncured mat stack to be next pressed/clamped from the loader into the press machine and pressing/clamping of the stack can be completed well ahead of return of the first transfer means to the exit of the press machine.

DESCRIPTION OF THE DETAILED EMBODIMENTS

In the following, one embodiment of the system according to the present invention for manufacturing a stack the manufacture of which involves pressing/clamping and curing will be described with reference to FIG. 1. In this connection, the system shown in FIG. 1 is basically the same as that previously described with reference to FIGS. 5 and 6, except that constituent members of "waiting stage S" and "second transfer means 40" which will be described below and a fifth traverser TR5 are further provided.

Accordingly, the same reference numbers and letters will be allotted to the members as allotted to the corresponding members of the system shown in FIG. 5 to eliminate overlapping explanation, and the differences will be described principally hereinbelow.

Figure 1:
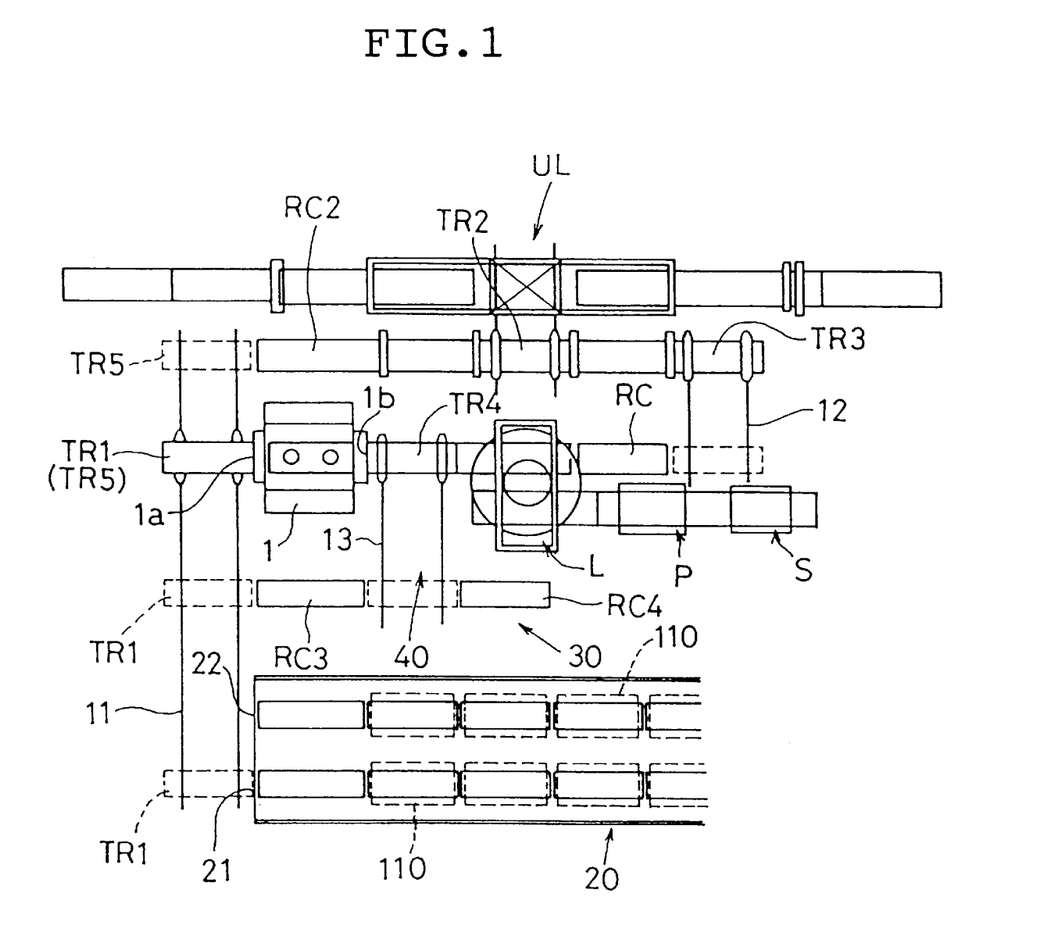
FIG. 1 is an illustrative view of one embodiment of the system according to the present invention for manufacturing a stack of which the manufacture involves pressing/clamping and curing.

As shown in FIG. 1, the system according to the present invention is provided with a waiting stage 30 between a press machine 1 and a curing chamber 20. In the waiting stage 30, a roller conveyor RC3 is installed preferably in such a manner that a mat stack 110 is transferred in the same direction as in the press machine 1. A first traverser TR1 which travels along rails 11 can be stopped at the junctional position with the roller conveyor RC3, and a mat stack 110 on the first traverser TR1 can be transferred to the roller conveyor RC3. This embodiment is further provided with a roller conveyor RC4 as a second waiting stage for emergency use.

Between roller conveyor RC1 and the roller conveyor RC3 (and a roller conveyor RC4, if provided), rails 13 are constructed in proximity to a mat stack receiving entrance 1b of the press machine 1 in terms of the roller conveyor RC1, and a fourth traverser TR4 reciprocates therealong. The rails 13 and the fourth traverser TR4 constitute the "second transfer means" in the present invention.

Operation of this system will be described. Transfer of an uncured mat stack 110 from the press machine 1 to the curing chamber 20 is performed by the first traverser TR1 in the same manner as in the above-described conventional system. In this embodiment, the first traverser TR1 receives a cured stack 110 clamped under pressure between an upper plate 8 and a lower plate 9 at an exit 22 of the curing chamber 20, and is returned along the rails 11 and stopped at the junctional position with the roller conveyor RC3 in the waiting stage 30. The stack 110 on the first traverser TR1 is transferred to the roller conveyor RC3 together with the upper and lower plates 8, 9 by means of a controlling mechanism (not shown).

In parallel with this, the preceding stack 110, which has been transferred onto the roller conveyor RC3 in the waiting stage 30 and which is now standing by, is rapidly transferred together with the upper and lower plates 8, 9 to an upstream position relative to the entrance 1b of the press machine 1 by means of the fourth traverser TR4 and then fed into the press machine 1 which is unoccupied at this time. In the press machine 1, re-pressing and unclamping are conducted as described with respect to the conventional system. The resulting stack 110, as a cured board on the lower plate 9, is discharged from the press machine 1 and transferred to an unloader UL by means preferably of the fifth traverser TR5 provided aside from the first traverser TR1. The stack 110 as a cured board and the lower plate 9 are separated in the unloader UL and separately taken out therefrom.

During the re-pressing and unclamping in the press machine 1, the fourth traverser TR4 remains in front of the entrance 1b of the press machine 1 and waits for the uncured mat stack 1 10 to arrive from a rotary loader L. The uncured mat stack 110 is fed into the press machine 1, which has been unoccupied after the delivery of the preceding unclamped stack, and pressed and clamped. In advance of completion of the pressing and clamping, the first traverser TR1 has returned from the junctional position with the roller conveyor RC3 in the waiting stage or station 30 to an exit 1a of the press machine 1. The pressed and clamped stack 110 is transferred to the first traverser TR1 together with the lower plate 9, and moved toward the curing chamber 20. In parallel with this, the fourth traverser TR4 is returned to the junctional position with the roller conveyor RC3 (and the roller conveyor RC4) in the waiting station 30.

As described above, according to the system of the present invention, by the return of the first traverser TRI, the first transfer means to the exit 1a of the press machine 1 from the delivery of a stack 110 pressed/clamped in the press machine 1 to the curing chamber 20, the press machine 1 is ready to deliver a pressed/clamped stack to be subsequently transferred. This enables a greatly shortened interval between the removal of one unclamped stack from the press machine and the removal of the next, as compared with the case of the conventional system where after the return of the first traverser TR1 (first transfer means) to the port 1a of the press machine 1, a cured stack which the first traverser TR1 has carried is re-pressed and unclamped.

In other words, during the collecting of a cured stack from the curing chamber, the preceding cured stack which has been collected and is standing by is taken and transferred by means of the separately provided traverser to the press machine and unclamped in the press machine. Accordingly, the collecting of a cured stack and the unclamping can be carried out in parallel, thereby enabling a shortened period of time per cycle of these steps to be realized. This leads to greatly improved productivity. Further, as is apparent from FIG. 1, the second transfer means can readily be installed without making any considerable modification to the conventional system. This enables improved productivity to be realized at a low cost.

Figure 2:
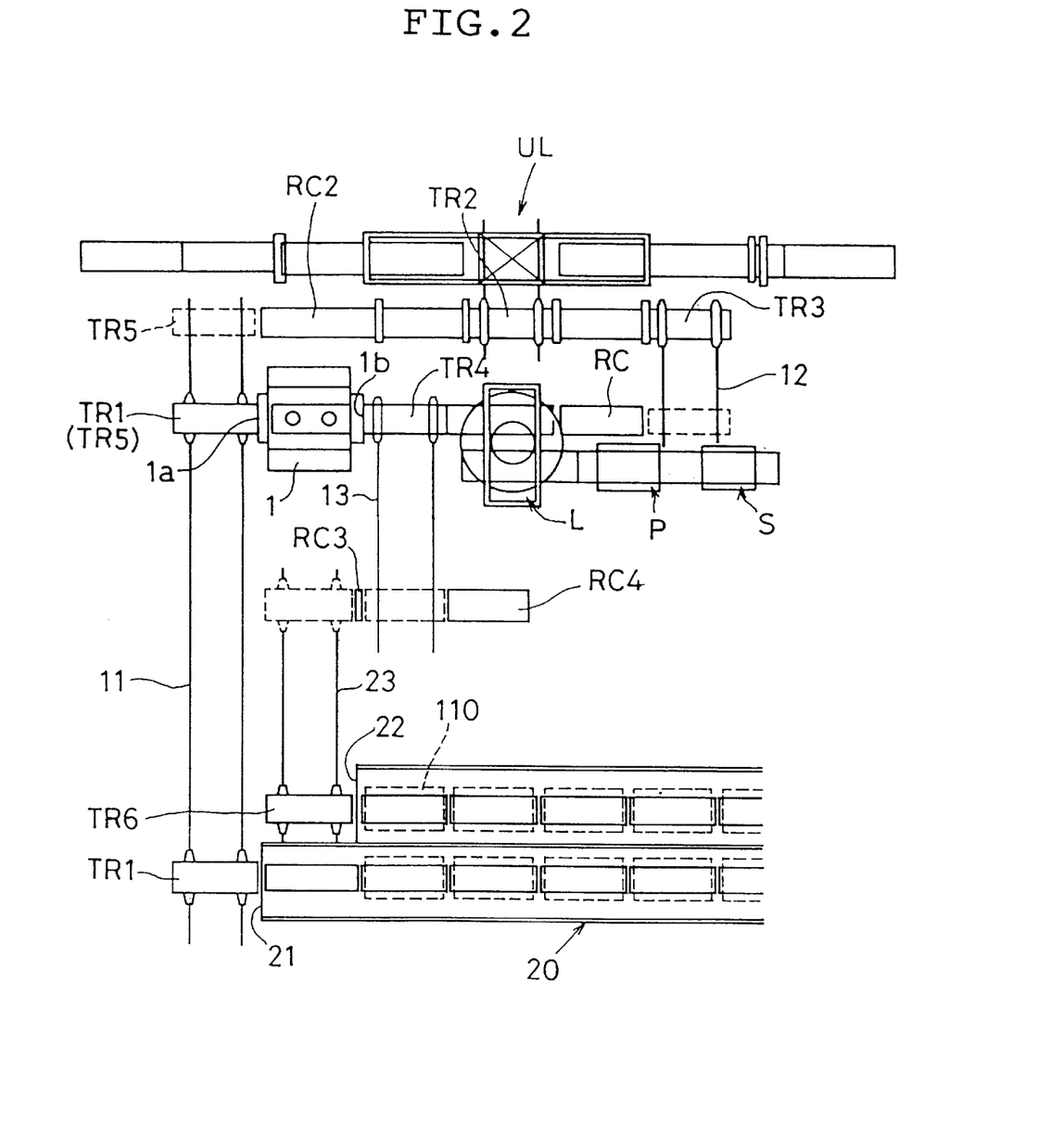
FIG. 2 is an illustrative view of another embodiment of the system according to the present invention for manufacturing a stack of which the manufacture involves pressing/clamping and curing.

FIG. 2 shows another embodiment. In this embodiment, a cured stack 110 is transferred to a roller conveyor RC3 (and a roller conveyor RC4) and placed in a waiting stage or station 30 by means of a sixth traverser TR6 which reciprocates along rails 23 separately constructed for delivery between the roller conveyor RC3 and an exit 22 of a curing chamber 20 instead of by means of a first traverser TR1 which travels along rails 11. In this embodiment, the rails 23, rails 13, the sixth traverser TR6, and a fourth traverser TR4 constitute "second transfer means" in the present invention.

In this embodiment, the first traverser TR1 is in charge only of the transfer of an uncured stack 110 to the curing chamber 20. The delivery of a cured stack 110 from the curing chamber 20 to the roller conveyor RC3 is carried out by means of the sixth traverser TR6. Accordingly, flexibility in the feeding and delivery operations is further increased, thereby attaining further improved productivity. In this connection, if transfer of a stack 110 from the sixth traverser TR6 to the fourth traverser TR4 which travels along rails 13 can smoothly be carried out in the absence of the roller conveyor RC3, it is possible to attain intended result in the absence of the roller conveyor RC3.

Figure 3:
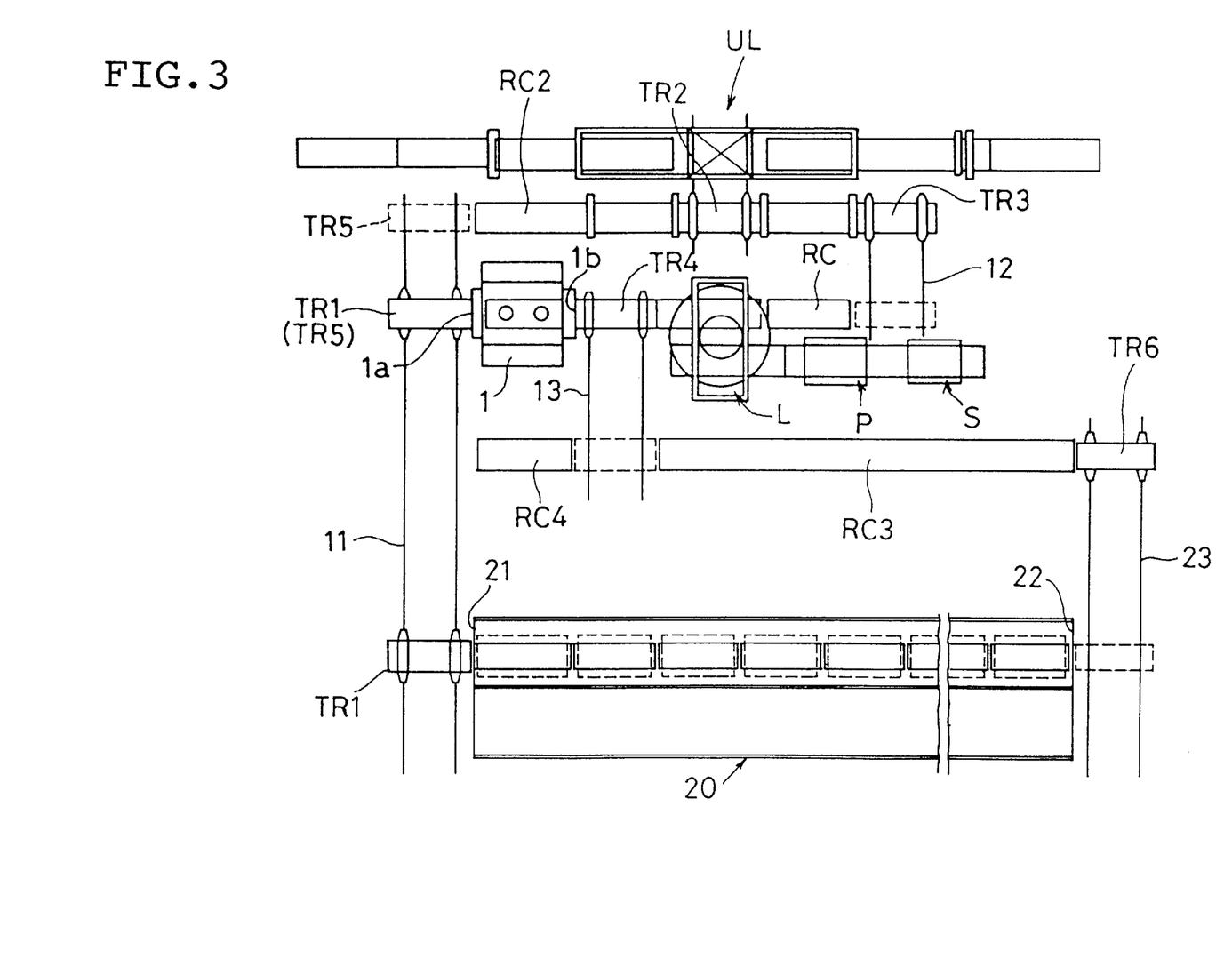
FIG. 3 is an illustrative view of still another embodiment of the system according to the present invention for manufacturing a stack of which the manufacture involves pressing/clamping and curing.

FIG. 3 shows still another embodiment. In this embodiment, a plurality of curing chambers 20, each having an entrance and an exit which are oppositely located, are provided in parallel, and rails 11 and rails 23 are constructed on the entrance side and the exit side, respectively. Operation of this embodiment is substantially the same as that of the embodiment in FIG. 2. According to the structure of this embodiment, however, layout of the curing chambers 20 can advantageously be simplified.

Figure 4:
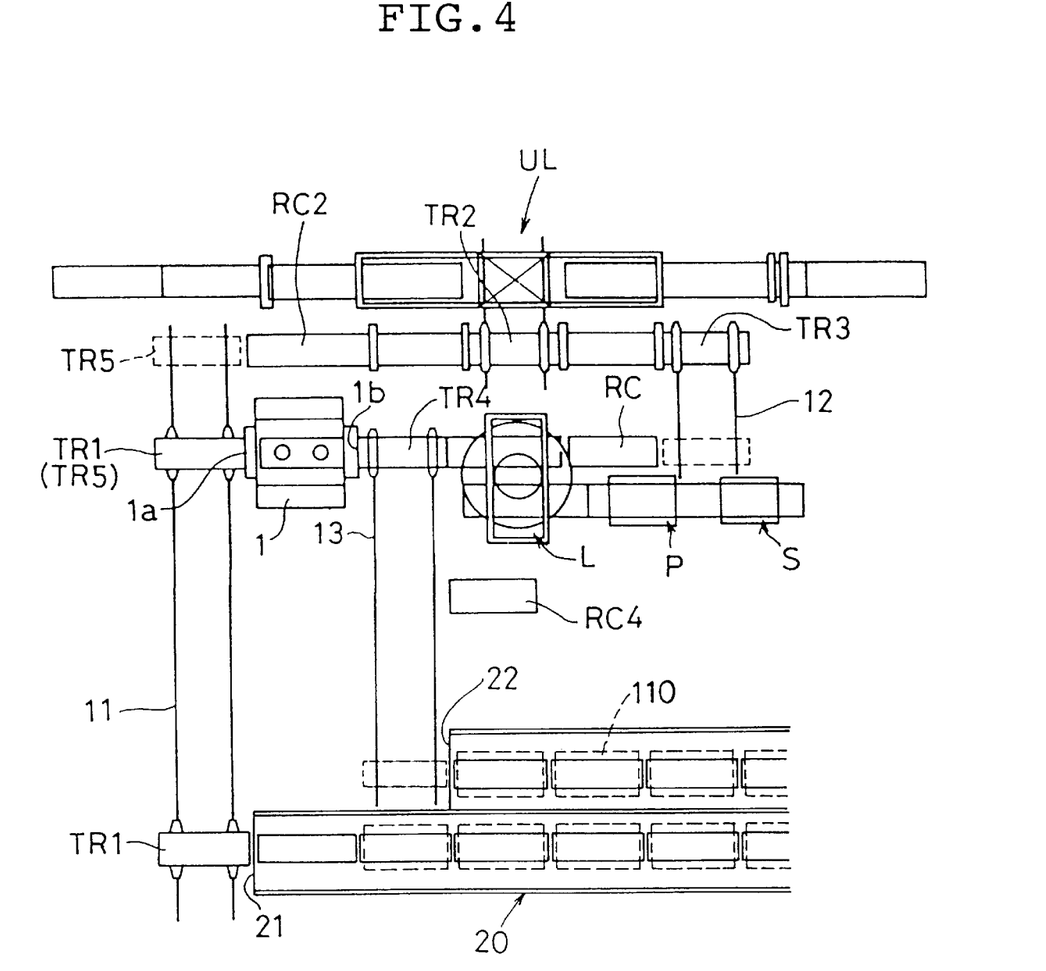
FIG. 4 is an illustrative view of a further embodiment of the system according to the present invention for manufacturing a stack of which the manufacture involves pressing/clamping and curing.

FIG. 4 shows a further embodiment. In this embodiment, an entrance 1b of a press machine 1 and an exist 22 of a curing chamber 20 are directly connected by a continuous line of rails 13, along which a fourth traverser TR4 reciprocates. It is thereby possible to transfer a cured stack 110 directly from the exit 22 of the curing chamber 20 to the entrance 1b of the press machine 1. Accordingly, no waiting stage is required in contrast to the above embodiments. This embodiment thereby provides additional space-saving as compared with the embodiments shown in FIGS. 2 and 3. In FIG. 4, RC4 represents a roller conveyor which is used as a waiting stage in emergency, and accordingly it may be omitted.

In the foregoing, one aspect of the system of the present invention for manufacturing a stack of which the manufacture involves pressing/clamping and curing has been described. However, it is to be understood that the present invention is by no means restricted to the system having that aspect and that various modifications may be made within the scope of the present invention. For example, in the above embodiments, the product is a "wood-cement board" by way of an example, and the "curing chamber" is described consequently as a chamber for curing and hardening. However, in a case of a product of which manufacture involves pressing/clamping and curing but does not involve hardening, for example, a panel board prepared by bonding with an adhesive, a chamber only for curing is of course used. Accordingly, the term "curing chamber" used herein means a chamber for curing as well as a chamber for curing and hardening.

Further, when the first traverser TR1 is empty, the traveling speed of the first traverser TR1 may be increased without causing any problem in terms of safety. Accordingly, the first traverser TR1 may be in charge of the transfer of an unclamped cured stack to the unloader UL in the absence of the fifth traverser TR5.

As described above, according to the system of the present invention for manufacturing a stack that involves pressing/clamping and curing, the step of delivery of a pressed/clamped stack from the press machine to the curing chamber and the step of delivery of a cured stack from the curing chamber to the press machine can be carried out in parallel by separately providing additional transfer means. It is thereby possible to attain a shortened interval between takeouts of an unclamped stack. This leads to greatly improved productivity. The addition of the separate transfer means makes no substantial modification to the conventional system. Accordingly, the conventional system can substantially be utilized in constructing the improved system. A large equipment investment, for example, due to separately providing a press machine for repressing/unclamping is, accordingly, not required. This enables improved productivity to be realized at a low cost.

What is claimed is:

1. A method for manufacturing mats, comprising:
   pressing and clamping a stack of uncured mats with a press machine;
   transferring said stack of uncured mats after said pressing and clamping to a curing chamber by a first transfer device;
   curing said stack of uncured mats in said curing chamber yielding a cured stack of mats;
   transferring said cured stack of mats from said curing chamber to said press machine by a second transfer device; and
   repressing and unclamping said cured stack of mats with said press machine.

2. A method for manufacturing mats, comprising:
   pressing and clamping a stack of uncured mats with a press machine;
   transferring said stack of uncured mats from an exit of said press machine to an entrance of a curing chamber by a first transfer device;
   curing said stack of uncured mats in said curing chamber yielding a cured stack of mats;
   transferring said cured stack of mats from an exit of said curing chamber to a waiting station by said first transfer device;

transferring said cured stack from said waiting station to said press machine by a second transfer device; and repressing and unclamping said cured stack of mats with said press machine.

3. An apparatus for manufacturing a stack of mats, the manufacture of which involves pressing, clamping and curing a stack of uncured mats, said apparatus comprising:

a press machine for pressing and clamping a stack of uncured mats and for repressing and unclamping a stack of cured mats;

a curing chamber for curing the pressed and clamped stack;

a first transfer device connecting said press machine and said curing chamber, said first transfer device transferring the pressed and clamped stack from the press machine to the curing chamber;

a second transfer device connecting said press machine and said curing chamber, said second transfer device transferring a cured stack from the curing chamber to said press machine.

4. An apparatus for manufacturing a stack of mats, including pressing, clamping and curing thereof, said apparatus comprising:

a press machine for pressing and clamping a stack of uncured mats and for repressing and unclamping a stack of cured mats;

a curing chamber for curing the pressed and clamped stack;

a waiting station located between said press machine and said curing chamber, a first transfer device connecting said press machine, said waiting station and said curing chamber, said first transfer device transferring the pressed and pressed and clamped stack from an exit of said press machine to an entrance of said curing chamber and transferring a cured stack from an exit of said curing chamber to said waiting station; and a second transfer device connecting said waiting station and said press machine, said second transfer device transferring a cured stack placed in said waiting station to an entrance of said press machine.

5. An apparatus for manufacturing a stack of mats according to claim 4, further comprising:

a third transfer device connecting said exit of said curing chamber with said waiting station, said first transfer means interconnecting said exit of said press machine and said entrances of said curing chamber.

6. An apparatus for manufacturing a stack of mats according to claim 4, wherein said waiting station comprises at least one roller conveyor connecting between said first transfer device and said second transfer device.

7. An apparatus for manufacturing a stack of mats according to claim 5, wherein said waiting station includes at least one roller conveyor so that stacks can be moved therealong, said at least one roller conveyor feeding stacks to said second transfer device and receiving stacks from said third transfer device.

8. An apparatus for manufacturing a stack of mats according to claim 7, wherein said waiting station includes at least one additional roller conveyor so that additional waiting space is provided, said additional roller conveyor being connected with said second transfer device.

9. An apparatus for manufacturing a stack of mats according to claim 4, wherein said second transfer device is further connected to an exit of said curing chamber so that a cured stack can be moved between said exit, said waiting station and an entrance of said press machine.

* * * * *